United States Patent
Hartmann et al.

[11] Patent Number: 5,959,005
[45] Date of Patent: Sep. 28, 1999

[54] SILANIZED SILICA

[75] Inventors: Werner Hartmann, Babenhausen; Juergen Meyer, Rheinfelden; Hauke Jacobsen, Bruchkoebel; Thomas Hennig, Gelnhausen; Henning Karbe, Gustavsburg; Uwe Schachtely, Rodenbach, all of Germany

[73] Assignee: Degussa-Hüls Aktiengesellschaft, Frankfurt am Main, Germany

[21] Appl. No.: 08/843,207

[22] Filed: Apr. 14, 1997

Related U.S. Application Data

[60] Provisional application No. 60/021,599, Jul. 11, 1996.

[30] Foreign Application Priority Data

Apr. 26, 1996 [DE] Germany .................. 196 16 781

[51] Int. Cl.$^6$ ..................... C08K 3/34
[52] U.S. Cl. .......... 523/213; 523/216; 524/262; 524/493; 428/405; 501/54; 65/114
[58] Field of Search ................... 523/213, 216; 428/405; 65/114; 501/54; 524/262, 493

[56] References Cited

U.S. PATENT DOCUMENTS

| | | | |
|---|---|---|---|
| 4,072,796 | 2/1978 | Reinhardt et al. | 428/405 |
| 4,191,587 | 3/1980 | Kratel et al. | 428/405 |
| 4,845,004 | 7/1989 | Kobayashi | 428/405 |
| 5,429,873 | 7/1995 | Deusser et al. | 428/405 |
| 5,486,420 | 1/1996 | Nishihara et al. | 428/405 |
| 5,504,147 | 4/1996 | Fujiki et al. | 524/493 |

*Primary Examiner*—Andrew E. C. Merriam
*Attorney, Agent, or Firm*—Smith, Gambrell & Russell, LLP

[57] ABSTRACT

Silica with the following physico-chemical properties:

| | | |
|---|---|---|
| Specific surface | m$^2$/g | 80–400 |
| Primary particle size | nm | 7–40 |
| Tapped density | g/l | 50–300 |
| pH value | | 3–10 |
| Carbon content | % | 0.1–15 |
| DBP number | % | <200 | is produced by spraying a silica under intensive mixing, optionally with water or dilute acid at first and then with a surface-modifying reagent or a mixture of several surface-modifying reagents, then mixing, tempering, and subsequently destructuring/compressing and grinding.

3 Claims, No Drawings

SILANIZED SILICA

REFERENCE TO A RELATED APPLICATION

The provisional application 60/021,599 filed Jul. 11, 1996 and the German priority application 196 16 781.7 are relied on and incorporated by reference.

INTRODUCTION

The present invention relates to a low-thickening, silanized silica, a method of its production and its use.

SUMMARY OF THE INVENTION

The present invention features a silanized silica with the following physico-chemical properties:

| | |
|---|---|
| Specific surface area[1] m$^2$/g | 80–400 |
| Primary particle size[2] nm | 7–40 |
| Tamped density[3] g/l | 50–300 |
| pH value | 3–10 |
| Carbon content % | 0.1–15 |
| DBP number[4] % | <200. |

[1]according to BET
[2]according to electron microscope
[3]according to DIN ISO 787/11
[4]according to DIN 53601

Further subject matter of the invention is constituted by a method of producing the silanized, low-thickening silica which is characterized in that a silica is sprayed in a suitable mixing container under intensive mixing, optionally with water or dilute acid at first and then with a surface-modifying reagent or a mixture of several surface-modifying reagents, is then mixed for 15 to 30 minutes, tempered at a temperature of 100 to 400° C. for a period of 1 to 6 h and the hydrophobic, silanized silica obtained thereby is subsequently destructured/compressed by mechanical action (e.g. in a ball mill) and then ground in a mill (e.g. an air-jet mill or pinned disk mill).

DETAILED DESCRIPTION OF INVENTION

In carrying out the present invention, a silica pyrogenically produced by the flame hydrolysis of $SiCl_4$ can be preferably used as the starting material silica.

Hexamethyldisilazane is preferably used as the surface-modifying reagent.

In a further aspect of the present invention, the low-thickening, silanized silica produced in accordance with the method disclosed herein is used for producing low-viscosity polymer systems with a low flow point such as e.g. 1- and 2-component peroxide condensation- and addition-cross-linking silicon rubber systems, adhesives, molding compounds, jointing compounds, etc. In addition, the silica of the invention can be used as a flatting agent, e.g. in paints, foils, as free-flow agent (e.g. S.A.P., fire-extinguishing powder), for the production of cable gels, as an anti-sedimentation agent in liquid plastic systems and reaction resins (e.g. synthetic marble, polymer concrete, dentures), and as a polishing agent and/or scouring bodies.

The low-thickening, silanized silica in accordance with the invention has the following advantages:

Good mechanical strengths are not obtained in polymer systems reinforced with synthetic silicas until at very high degrees of filling. This succeeds in known silicas only by an in-situ hydrophobing of the reinforcing silica during the production/compounding of corresponding jointing compounds, molding compounds and doubling compounds, etc. This method is very consuming of time and energy.

The silica in accordance with the invention makes possible e.g. high degrees of filling and therewith good mechanical strengths by means of its low thickening action and low flow point. The above-mentioned, expensive compounding process can be largely eliminated.

The method in accordance with the invention has the advantage that as a result of the continuous process, reduced variations occur in the quality of the product.

EXAMPLE

Aerosil 200, a pyrogenically produced silica by Degussa AG, is mixed with 4.3 parts water and 18.5 parts HMDS (hexamethyldisilazane) and tempered at 140° C. The hydrophobic, silanized silica is then compressed on a continuously operating vertical ball mill to approximately 250 g.l. The silica is then ground by an air-jet mill. The silica obtained has the following properties:

| Example | BET m$^2$/g | Tapped density g/l | pH | C-content | Drying loss | Annealing loss | DBP number |
|---|---|---|---|---|---|---|---|
| VT 1128/1 | 145 | 188 | 7.3 | 2.7 | 2.4 | 0.3 | 90 |

Application technology test
2K-RTV silicone rubber (degree of filling 20%)
Rheology:  Flow point 1.9 Pa
           Viscosity 30.9 s$^{-1}$
Mechanical properties:  Tensile strength       1.7 N/mm$^2$
                        Breaking elongation    230%
                        Tear strength          14.0 N/mm
                        Shore A hardness       34

We claim:

1. A method of producing a surface modified, hydrophobic silanized silica powder with the following physico-chemical properties:

| Specific surface area according to BET | m$^2$/g | 80–400 |
|---|---|---|
| Average Primary particle size area according to electron microscope | nm | 7–40 |
| Tamped density according to DIN 1S0 787/11 | g/l | 50–300 |
| pH value | | 3–10 |
| Carbon content | % | 0.1–15 |
| DBP number according to DIN 53601 | % | <200 | consisting essentially of spraying pyrogenically produced silica powder in a mixing container under intensive mixing, with water or dilute acid at first and then with hexamethyldisilazanie, mixing for 15 to 30 minutes, and tempering at a temperature of 100 to 400° C. for a period of 1 to 6 hours to produce a hydrophobic, silanized silica.

2. The method according to claim 1 further comprising subsequently destructuring or compressing said silica by mechanical action.

3. The method according to claim 2 further comprising grinding said silica.

* * * * *